(12) United States Patent
Braatz et al.

(10) Patent No.: US 10,316,566 B2
(45) Date of Patent: Jun. 11, 2019

(54) MODULAR DOOR DRIVE CONTROL SYSTEM, AND MODULAR DOOR DRIVE SYSTEM

(71) Applicant: Siemens Aktiengesellschaft, Munich (DE)

(72) Inventors: Uwe Braatz, Hannover (DE); Michael Krause, Hannover (DE); Uwe Krause, Pattensen (DE); Heinz Ludwig, Wennigsen (DE); Uwe Nolte, Barsinghausen (DE); Michael Wittkowski, Telgte (DE)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 15/321,317

(22) PCT Filed: Jun. 24, 2015

(86) PCT No.: PCT/EP2015/064268
§ 371 (c)(1),
(2) Date: Dec. 22, 2016

(87) PCT Pub. No.: WO2016/001038
PCT Pub. Date: Jan. 7, 2016

(65) Prior Publication Data
US 2017/0198514 A1    Jul. 13, 2017

(30) Foreign Application Priority Data

Jun. 30, 2014 (DE) .......................... 10 2014 212 553

(51) Int. Cl.
*E05F 15/603* (2015.01)
*E05F 15/70* (2015.01)
(Continued)

(52) U.S. Cl.
CPC .......... *E05F 15/603* (2015.01); *B66B 13/143* (2013.01); *E05F 15/70* (2015.01);
(Continued)

(58) Field of Classification Search
CPC ...... E05F 15/603; G05B 15/02; B66B 13/143
See application file for complete search history.

(56) References Cited

U.S. PATENT DOCUMENTS 5,770,934 A * 6/1998 Theile .................. H02H 7/0851
318/466
5,789,887 A * 8/1998 Elischewski ....... G05B 19/0428
318/286
(Continued)

FOREIGN PATENT DOCUMENTS

CN        101936110             1/2011
CN        106660753 A  *  5/2017  ............ E05F 15/603
(Continued)

OTHER PUBLICATIONS

Office Action dated Mar. 28, 2018 which issued in the corresponding Chinese Patent Application No. 201580035747.3.
(Continued)

*Primary Examiner* — Laura M Menz
(74) *Attorney, Agent, or Firm* — Cozen O'Connor

(57) ABSTRACT

A modular door drive control system for subjecting electrical drive motors to open-loop control and/or closed-loop control to open and close doors or door leaves in different applications includes at least one motor control unit, and a plurality of peripheral adaptation units for adapting the motor control unit or a plurality of the motor control units to match one of the different applications, where the motor control unit or a plurality of the motor control units are selectively connectable to each of the peripheral adaptation units to transmit electrical power for the drive motor, which
(Continued)

is respectively connected to the motor control unit, via a common intermediate circuit such that door drive controllers for different applications can be realized with the aid of a modular door drive control system of this kind, without a relatively high level of expenditure on adaptation.

21 Claims, 8 Drawing Sheets

(51) Int. Cl.
    *B66B 13/14*      (2006.01)
    *G05B 15/02*      (2006.01)

(52) U.S. Cl.
    CPC .......... *G05B 15/02* (2013.01); *E05Y 2400/40* (2013.01); *E05Y 2400/41* (2013.01); *E05Y 2900/104* (2013.01); *E05Y 2900/404* (2013.01)

(56) References Cited

U.S. PATENT DOCUMENTS

| | | | | |
|---|---|---|---|---|
| 6,137,255 | A * | 10/2000 | Skalski | G05B 19/232 318/560 |
| 6,262,548 | B1 * | 7/2001 | Scholten | E05F 15/614 16/62 |
| 6,326,751 | B1 * | 12/2001 | Mullet | E05D 13/00 318/266 |
| 6,338,693 | B1 * | 1/2002 | Scholten | E05F 15/614 477/7 |
| 7,246,688 | B2 * | 7/2007 | Tonna | B66B 13/08 187/324 |
| 2001/0037605 | A1 * | 11/2001 | Finke | E05D 15/0652 49/360 |
| 2003/0089557 | A1 | 5/2003 | Eilinger | |
| 2005/0146305 | A1 | 7/2005 | Kneller | |
| 2008/0047200 | A1 | 2/2008 | Krause et al. | |
| 2008/0063496 | A1 * | 3/2008 | Bufano | H01L 21/67017 414/331.01 |
| 2014/0009896 | A1 | 1/2014 | Nikola et al. | |
| 2017/0198514 | A1 * | 7/2017 | Braatz | E05F 15/603 |

FOREIGN PATENT DOCUMENTS

| | | | | |
|---|---|---|---|---|
| DE | 19 847 789 A1 | 4/2000 | | |
| DE | 10 102 714 A1 | 8/2002 | | |
| DE | 10 257 721 A1 | 7/2004 | | |
| DE | 10 2011 004 019 A1 | 8/2012 | | |
| DE | 10 2011 015 327 A1 | 10/2012 | | |
| DE | 102014212553 B3 * | 7/2015 | ............ | E05F 15/603 |
| EP | 1 102 390 A2 | 5/2001 | | |
| EP | 1 894 877 A2 | 3/2008 | | |
| EP | 3129572 A1 * | 2/2017 | ............ | E05F 15/603 |
| WO | WO 01/74699 A1 | 10/2001 | | |
| WO | WO 03/085818 A1 | 10/2003 | | |
| WO | WO-2016001038 A1 * | 1/2016 | ............ | E05F 15/603 |

OTHER PUBLICATIONS

Sew Eurodrive; "Praxis der Antriebstechnik—Servotechnik"; Ausgabe Sep. 2006; Sew-Eurodrive GmbH & Co. KG; Bruchsal, 2006.

* cited by examiner

MODULAR DOOR DRIVE CONTROL
SYSTEM, AND MODULAR DOOR DRIVE
SYSTEM

CROSS-REFERENCE TO RELATED APPLICATIONS

This is a U.S. national stage of application No. PCT/EP2015/064268 filed 24 Jun. 2015. Priority is claimed on German Application No. 10 2014 212 553.7 filed 30 Jun. 2014, the content of which is incorporated herein by reference in its entirety.

BACKGROUND OF THE INVENTION

1. Field of the Invention

The invention relates to a modular door drive control system for subjecting electrical drive motors to open-loop control and/or closed-loop control to open and close doors or door leaves in different applications, such as in a lift, on a train platform or at a machine tool, and further relates to a modular door drive system comprising such a door drive control system.

2. Description of the Related Art

Door drive controllers are used in a multiplicity of different applications, where they are required to perform different drive tasks. Examples include the driving of doors, in particular sliding doors, in lifts, on train platforms for controlling access to trains, at the entrance to and within buildings, or for personal protection in the industrial environment, e.g., at machine tools.

EP 1 894 877 A2, DE 10 2011 004 019 A1, and EP 1 102 390 A2 disclose exemplary door drives comprising such door drive controllers.

Examples of electrical drive motors include direct-current motors or, more recently, electronically commutated brushless permanent-field synchronous motors, either with or without a gearing connected on the load side.

Doors having a single door leaf or doors having two door leaves must be moved in this case. If the door or door leaves are not heavy, provision is usually made for a single drive motor, which moves both door leaves via a toothed belt and a guide mechanism, for example. However, heavy doors have one or even a plurality of drive motors for each door leaf. In many applications, it is therefore necessary to move a plurality of different doors or their door leaves in a temporally synchronized manner.

In this case, the door drive controller may be deployed in different countries having voltage supply networks that are characterized by different rated voltages and voltage qualities.

The installation environment of the door drive controller and the drive motor may also differ from case to case.

Until now, it has therefore often been necessary to design a special door drive controller for each application or drive task, this involving expenditure and consequently costs.

SUMMARY OF THE INVENTION

In view of the foregoing, it is therefore an object of the present invention to reduce the expenditure of adapting a door drive controller to different applications.

This and other objects and advantages are achieved in accordance with the invention by a modular door drive control system for subjecting electrical drive motors to open-loop control and/or closed-loop control in order to open. and close doors or door leaves in different applications, such as in a lift, on a train platform or at a machine tool, having at least one motor control unit of application-independent design for generating an output voltage for feeding an electrical drive motor which is connected thereto, and a plurality of peripheral adaptation units of different application-dependent design in each case for adapting the motor control unit or a plurality of the motor control units to one of the different applications. For the purpose of transmitting electrical power for the drive motor respectively connected thereto, the motor control unit or a plurality of the motor control units can be selectively connected to any of the peripheral adaptation units via a shared intermediate circuit, preferably a DC voltage intermediate circuit. The at least one motor control unit has a device, preferably a microcontroller, for subjecting the output voltage to open-loop control and/or closed-loop control as a function of activation commands received via a communication link.

The door drive controller for a specific application is therefore composed of the peripheral adaptation unit that has been specially adapted to this application and one or more of the application-independent motor control units, these being connected together via an intermediate circuit.

As a consequence, application-dependent adaptations of the motor control unit and its usually many technically demanding and complex interfaces to the drive motor (e.g., for sensor signals from motor speed sensors) are unnecessary, thereby making it possible to avoid the expenditure previously required for such adaptations and any resulting errors.

Here, it is possible in a flexible manner selectively to operate one or more motor control units and drive motors on a shared power axis, i.e., using the same voltage and/or frequency, by virtue of the intermediate circuit, in particular a DC voltage intermediate circuit. It is consequently possible, e.g., for heavy doors to be driven by a plurality of small drives that can more easily be accommodated in existing installation spaces instead of one large drive, thereby allowing a further reduction in the expenditure on adaptation for the installation of the door drive controller or the door drive, and even completely new drive configurations. It is most advantageous that, by virtue of the peripheral adaptation unit, it is possible to provide a single central feeding point and a single central communication interface to a superordinate control.

The intermediate circuit can also be used to operate a plurality of drive motors synchronously or to use the accrued braking energy of some drive motor a to accelerate other drive motors via the intermediate circuit for the purpose of saving energy.

The peripheral adaptation unit can also be used for application-dependent energy management of the door drive controller or the door drive, e.g., in order to reduce standby consumption (e.g., switching off discharge resistors, completely switching off the supply to the motor control unit(s) that are connected via the intermediate circuit, disconnecting the power supply). Furthermore, the peripheral adaptation unit can be used to provide captured variables and switching states for the motor control unit(s).

Using a microcontroller, the application-independent motor control unit can have the required computing power for precise control of a power section, safety circuits and associated sensor technology.

It is thus possible to provide a modular door drive control system comprising a multiplicity of application-dependent peripheral adaptation units and only a limited number of application-independent motor control units, which can be deployed for a multiplicity of applications and drive tasks without the need for special adaptations. Here, the motor units can be re-used, can be optimized in terms of their structure, and can be manufactured in large unit volumes without application adaptation.

By virtue of the intermediate circuit, the door drive controllers that are realized using the inventive modular door to be spatially separate from the motor control unit(s) and the drive motors connected thereto. This allows flexible adaptation to different installation spaces and/or optimization of the construction space of the motor control unit, whereby expenditure on adaptation can likewise be reduced. Temperature-sensitive or EMC-sensitive components can be individually accommodated in the peripheral adaptation unit, whereby the expenditure for cooling or EMC measures can be avoided. In the case of lift door drive controllers, the motor control unit can be arranged on the top side of the lift cage or on the front side of the lift cage above the lift door, for example. The peripheral adaptation unit can then be arranged behind a switch indicator panel within the lift cage and accessible from this interior space. In the case of machine tools, the peripheral adaptation unit can be arranged in an electrical-control cabinet and therefore have a relatively low degree of protection, and the motor control unit and the attached drive motor can be arranged with a high degree of protection in the actual tool, for example.

The peripheral adaptation units preferably have application-dependent input interfaces, in particular for a voltage supply, for control signals and/or for communication with a superordinate controller, and application-independent output interfaces for a connection of the intermediate circuit and for a communication link to the motor unit(s). Programming of a motor unit via new parameters or new firmware can also be effected centrally by a peripheral adaptation unit via the communication link.

In accordance with a further advantageous embodiment, the peripheral adaptation units have a device, preferably a microcontroller, for controlling the peripheral adaptation unit and for application-dependent generation of activation commands for the motor unit(s). The motor unit(s) can be selectively connected via the communication link to any of the peripheral adaptation units to transmit the activation commands to the motor unit(s). Therefore the generation of the activation commands for the motor unit(s) does not necessarily have to occur in a superordinate controller, but can occur in the peripheral adaptation units, thereby avoiding expenditure on adaptation in the superordinate controller.

For adaptation of the door drive controller to different supply networks, the peripheral adaptation units are preferably configured to convert an application-dependent input voltage that is present at an application-dependent interface for a voltage supply into an application-independent output voltage for the intermediate circuit.

The peripheral adaptation units are advantageously configured to realize one or more of the following application-dependent functions for processing an input-side supply voltage: protection against short-circuit, rectification of the supply voltage, network filtering for increased electromagnetic interference resistance, power factor correction, protection against network overvoltage or network undervoltage.

Furthermore, the peripheral adaptation units are preferably configured to realize one or more of the following application-dependent functions for a braking mode of the drive motors: ballast resistance including activation for limiting an intermediate circuit voltage in the case of regenerative motor operation, storage of the braking energy for subsequent use during acceleration, return feed of braking energy into a supply network.

In order to ensure at least temporary preservation of the operability of the door drive control system in the event of a failure of an external voltage supply, the peripheral adaptation units may include an emergency power device that allows a switchover to a secondary voltage supply (e.g., a battery supply).

The peripheral adaptation units are advantageously configured to allow application-dependent use and monitoring of the door drive controller, thereby aiding the commissioning, operation and maintenance of the door drive controller.

Moreover, the peripheral adaptation units are preferably configured to provide temporal synchronization of motive processes of drive motors if a plurality of motor control units are connected thereto.

In accordance with a further advantageous embodiment, the peripheral adaptation unit has a device for coupling to a cyber-physical system. This is understood to mean an architecture of information-oriented software-based components comprising mechanical and electronic parts, which communicate with each other via a data infrastructure such as the Internet. This allows integration of the door drive controller into self-organizing adaptive energy management systems. Here, the device for coupling to a cyber-physical system advantageously comprises a real-time runtime environment and a system of rules, which is followed in a flexible manner by the door drive controller in accordance with its predetermined limits and the current situation reported by other systems coupled to the cyber physical system (e.g., other door drive controllers), such that a specified task (e.g., a specification in respect of total energy consumption) can be managed by the system as a whole in real-time on the basis of rules. For example, this may result in the peripheral adaptation unit reducing standby consumption (e.g., switching off discharge resistors, completely switching off the supply to the motor control unit(s) connected via the intermediate circuit, disconnecting the power supply) at specified times (e.g., weekends, public holidays, vacations, company closure days).

The motor control unit(s) preferably has (have) application-independent input interfaces, in particular for a connection to the intermediate circuit and for a communication link to a peripheral adaptation unit, and application-independent output interfaces, in particular for the connection of a drive motor.

Furthermore, the motor control unit(s) advantageously has (have) at least one secure input for capturing safety-relevant information, thereby allowing this safety-relevant information to be processed and corresponding safety responses to be generated directly on site in a decentralized manner for a drive motor.

A modular door drive system in accordance with the invention comprises the door drive control system explained above, supplemented by a plurality of different drive units of application-independent design, each having a drive motor for the connection to the motor unit(s). In this case, the drive unit can have an electric motor designed as a gearless rotatory motor which turns about an axis of rotation and whose extent in the direction of the axis of rotation is smaller than its extent perpendicular to the axis of rotation (sometimes also referred to as a pancake motor). Such a motor can be arranged in a particularly simple manner above the lift door on the front side of the lift cage, with its axis of rotation perpendicular to the direction of movement of the door and hence without any need for a gearing connected on the load side.

Alternatively, the drive unit can have a rotatory electric motor which turns about an axis of rotation and has a gearing connected on the load side (driven side), in particular a bevel gear. Such a motor with gearing can likewise be arranged above the lift door on the front side of a lift cabin, where its axis of rotation then extends in the direction of movement of the door.

In order to simplify the on site assembly and to avoid incorrect connections, the motor control unit can be mechanically connected o the motor in both of these cases, forming a preassembled unit in particular. However, other drive solutions are also possible. The motor can also be designed as a linear motor, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and further advantageous embodiments of the invention as per features in the subclaims are explained in greater detail below with reference to exemplary embodiments in the figures, in which:

DETAILED DESCRIPTION OF THE EXEMPLARY EMBODIMENTS

Figure 1:
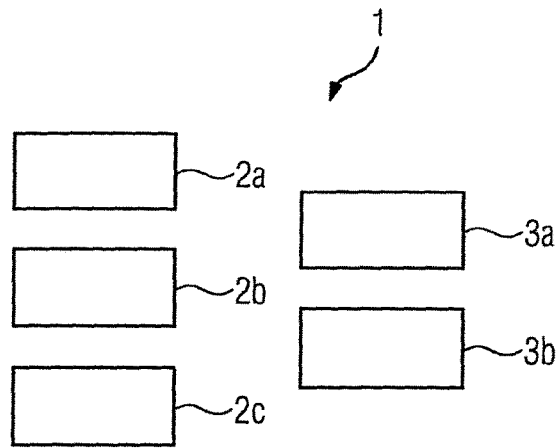
FIG. 1 shows a modular door drive control system in accordance with the invention.

FIG. 1 shows a simplified schematic illustration of a modular door drive control system 1 for subjecting electrical drive motors to open-loop control and/or closed-loop control in order to open and close doors or door leaves in different applications. The door drive control system 1 comprises three peripheral adaptation units 2a, 2b, 2c of different application-dependent design and two different motor units 3a, 3b or application-independent design.

For example, the applications relate to doors in a lift, on a train platform or at a machine tool. For example, the peripheral adaptation unit 2a is therefore configured to drive a lift door, the peripheral adaptation unit 2b is configured to drive a train platform door, and the peripheral adaptation unit 2c is configured to drive a machine tool door.

The motor control units 3a, 3b are of application-dependent design, but nonetheless differ with respect to their structural size and working capacity.

Figure 2:
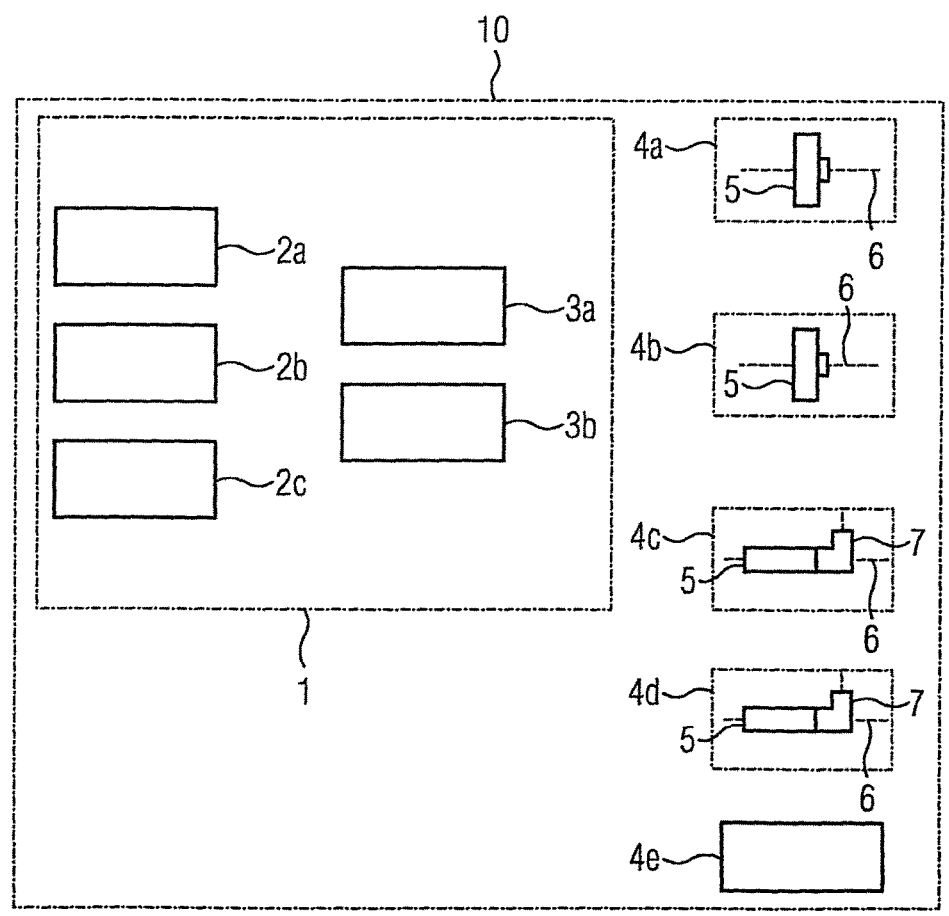
FIG. 2 shows a modular door drive system in accordance with the invention.

FIG. 2 shows a simplified schematic illustration of the modular doo drive control system 1 extended to form a modular door drive system 10. In addition to the peripheral adaptation units 2a, 2b, 2c and motor units 3a, 3b explained above with reference to FIG. 1, the door drive system 10 comprises different drive units of application-independent design 4a, 4b, 4c, 4d, 4e, each comprising an electrical drive motor 5.

Each of the drive units 4a, 4b has an electric motor 5 configured as a gearless rotatory motor that turns about an axis of rotation 6 and whose extent in the direction of the axis of rotation 6 is smaller than its extent perpendicular to the axis of rotation 6. Such motors are sometimes also referred to as pancake motors. The two drive units 4a, 4b are structurally identical in principle, but differ with respect to their structural size and working capacity.

Each of the drive units 4c, 4d comprises a rotatory electric motor 5 that turns about an axis of rotation 6 and has a gearing 7 arranged on the driven side, in particular a bevel gear. The two drive units 4c, 4d are structurally identical in principle, but differ with respect to their size and working capacity. The drive unit 4e is configured as a linear drive.

Figure 3:
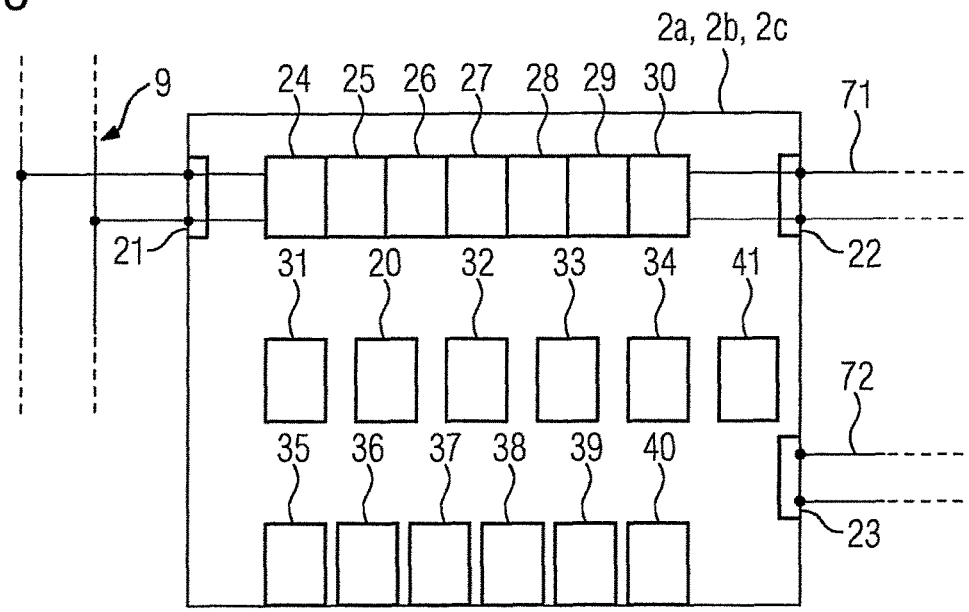
FIG. 3 shows a peripheral adaptation unit in accordance with the invention.

FIG. 3 shows a basic structure of the peripheral adaptation units 2a, 2b, 2c, the actual embodiment being application-dependent. As illustrated, the peripheral adaptation units 2a, 2b, 2c have a programmable microcontroller 21 as a central component for controlling the peripheral adaptation unit and for generating application-dependent activation commands for motor control unit(s).

Furthermore, the peripheral adaptation units 2a, 2b, 2c have application-dependent input interfaces, in particular for a voltage supply, for control signals and/or for communication with a superordinate controller, and application-independent output interfaces for an intermediate circuit 71 and for communication links 72 to the motor unit(s). In the case of the peripheral adaptation unit 2a, 2b, 2c illustrated in FIG. 3, the application-dependent interfaces are: (i) an interface 21 for connection to an external voltage supply network 9, (ii) a communication interface 35, e.g., for communication via PROFINET, PROFIBUS, CAN, Ethernet, RS485, USB, (iii) relay outputs 36, (iv) digital inputs 37, (v) analog inputs 38, (vi) safety inputs/outputs 39, and (vii) optional module 40 for coupling to cyber-physical systems.

The application-independent output interfaces are: (i) an interface 22 for connection to an intermediate circuit 71, in particular a DC voltage intermediate circuit, and (ii) an interface 23 for connection of a communication link 72 to a motor control unit.

In order to allow adaptation of the door drive controller to different supply networks 9, the peripheral adaptation units 2a, 2b, 2c are preferably configured to convert the application-dependent input voltage that is present at the application-dependent interface 21 for a voltage supply into an application-independent output voltage for the intermediate circuit 71. In addition, the peripheral adaptation units 2a, 2b, 2c realize one or more of the following application-dependent functions for processing an input-side supply voltage: protection against short-circuit, rectification of the supply voltage, network filtering for increased electromagnetic interference resistance, power factor correction, protection against network overvoltage or network undervoltage.

To this end, the peripheral adaptation units 2a, 2b, 2c have a power section that is controlled by the microcontroller 21 and comprises one or more of the following components: an input transformer 24, a filter and rectifier module 25, an overvoltage protection module 26, a power factor correction filter 27, a DC voltage intermediate circuit filter 29 and a circuit protection 30.

Furthermore, the peripheral adaptation unit 2a, 2b, 2c preferably realize one or more of the following application-dependent functions for a braking mode of the drive motors: electrical ballast resistance including activation via a braking chopper 28 for limiting the intermediate circuit voltage in the case of regenerative motor operation, storage of the braking energy for subsequent use during acceleration, and return feed of braking energy into the supplying network 9.

The peripheral adaptation units 2a, 2b, 2c advantageously allow application-dependent use and monitoring of the door drive controller, and consequently aid the commissioning and servicing. For this purpose, the peripheral adaptation units 2a, 2b, 2c have application-dependent status indicators 32 (e.g. in the form of LEDs), a display 33 and/or input elements 34, such as buttons or a keyboard. A low-voltage supply module 31 is also provided.

The module 40 for coupling to a cyber-physical system comprises a real-time runtime environment and a system of rules, which is followed in a flexible manner by the door drive controller in accordance with its predetermined limits and the current situation reported by other systems coupled to the cyber-physical system (e.g., other door drive controllers), such that a specified task (e.g., a specification in respect of total energy consumption) can be managed by the system as a whole in real-time on the basis of rules. For example, this may result in the peripheral adaptation unit reducing standby consumption (e.g., switching off discharge resistors, completely switching off the supply to the motor control unit(s) connected via the intermediate circuit, disconnecting the power supply) at specified times (e.g., weekends, public holidays, vacations, or company closure days).

In order to ensure at least temporary preservation of the operability of the door drive control system in the event of a failure of the external voltage supply network 9, the peripheral adaptation units 2a, 2b, 2c include an emergency power device 41 that allows a switch over to a secondary voltage supply (e.g., a battery supply). In this operating scenario, the microcontroller 21 can reduce the voltage in the intermediate circuit 71 and/or adapt the activation commands for the motor control units in order to save energy.

Figure 4:
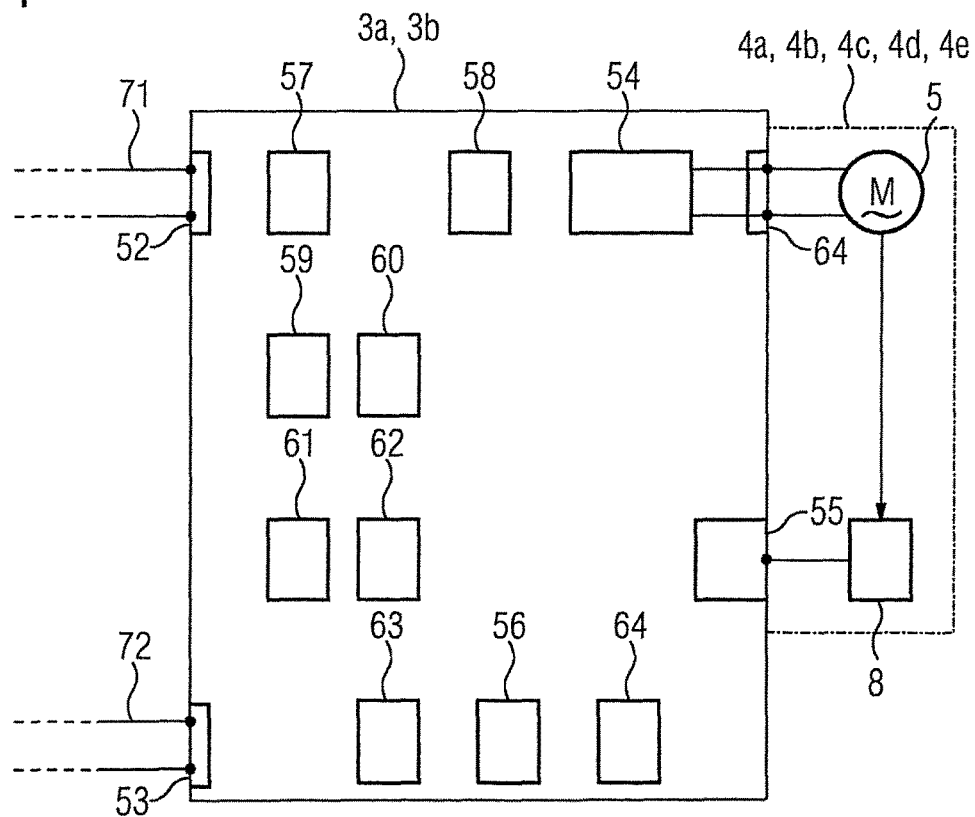
FIG. 4 shows a motor control unit in accordance with the invention.

As illustrated in FIG. 4, the motor control unit(s) 3a, 3b have application-independent input interfaces, in particular for a connection to the intermediate circuit and for a communication link to a peripheral adaptation unit, and application-independent output interfaces, in particular for connection of a drive motor.

Specifically, the motor control unit(s) 3a, 3b have:
an (application-independent) interface 52 for connection to an intermediate circuit 71, in particular a DC voltage intermediate circuit,
an (application-independent) interface 53 for connection of a communication link 72 to a peripheral adaptation unit,
an output stage 54 with an application-independent interface 64 for connection of a drive unit 4a, 4b, 4c, 4d, 4e,
an application-independent interface 55 for connection of a sensor 8 of the drive unit 4a, 4b, 4c, 4d, 4e,
a programmable microcontroller 56 for subjecting the output voltage to open-loop control and/or closed-loop control depending on activation commands received via the interface 53,
a DC voltage filter module 57,
a voltage supply 58,
an expansion bus 59,
safety circuits 60,
a debugging device 61,
a device 62 for ICT support,
status indicators 63 (e.g., in the form of LEDs), and
secure inputs 64 for capturing safety-relevant information, e.g., from a photoelectric barrier.

By virtue of the secure inputs 64, it is possible to capture and process safety-relevant in and generate corresponding safety responses directly on site in a decentralized manner for the drive unit 4a, 4b, 4c, 4d, 4e. The safety response may be, for example, a safely stoppage (SafeStop) or a safe torque removal (SafeTorqueOff) of the drive unit 4a, 4b, 4c, 4d, 4e.

Using a modular door drive system 10 as shown in FIGS. 1 to 4, it is now possible to realize a wide variety of door drive controllers, a few of which are shown by way of example in FIGS. 5 to 8.

Figure 5:
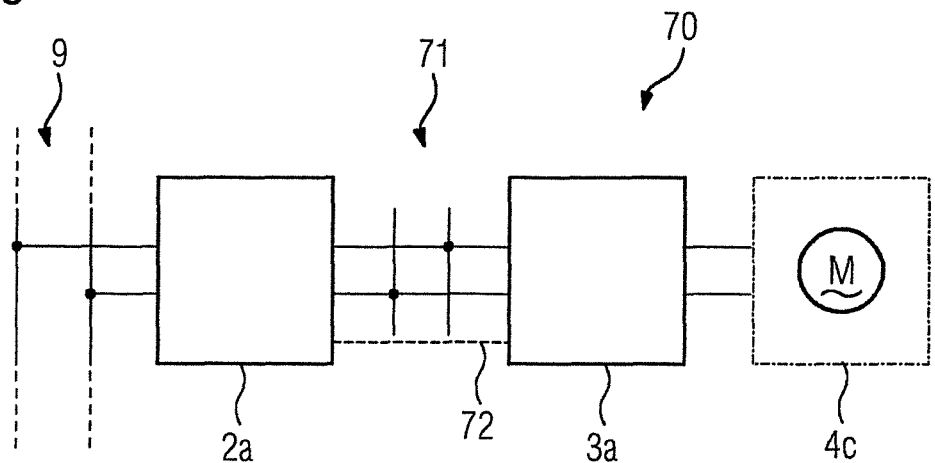
FIGS. 5-8 show examples of door drive controllers and door drives that are realized using a modular door drive system in accordance with the invention.

A door drive 70, as illustrated in FIG. 5 for moving a door of a lift cage, comprises a peripheral adaptation unit 2a for lift doors, a motor control unit 3a and a drive unit that is connected to the motor control unit 3a, here an exemplary drive unit 4c. The peripheral adaptation unit 2a and the motor control unit 3a are connected together via a DC voltage intermediate circuit 71 for the purpose of transmitting electrical power and via a communication link 72 for the purpose of transmitting activation commands for subjecting the output voltage for the drive unit 4c to open-loop control or closed-loop control.

Figure 6:
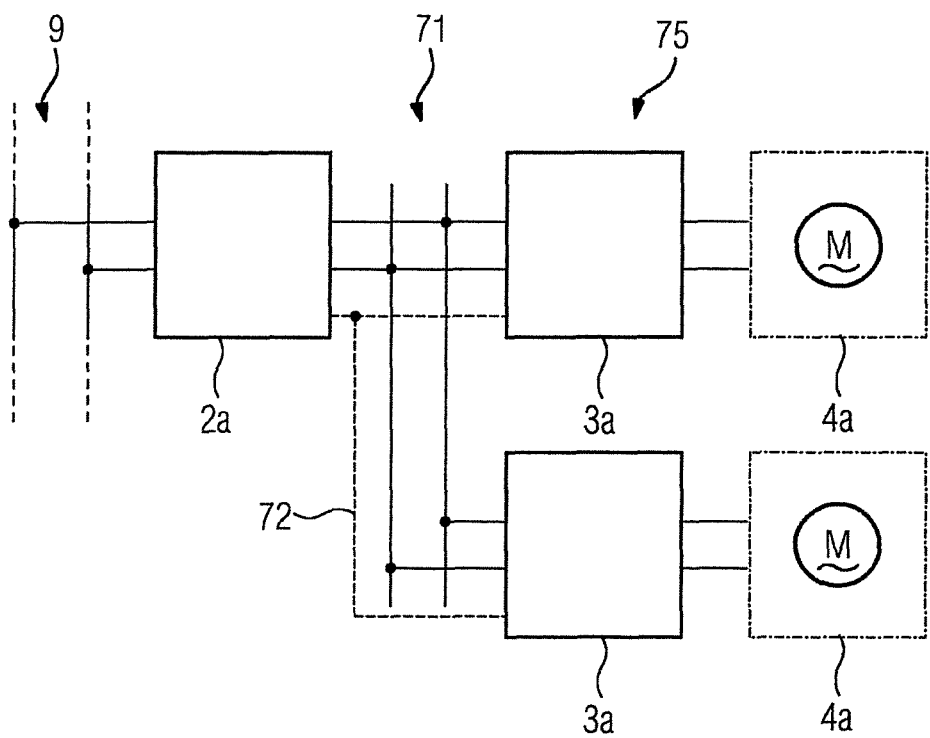

A door drive 75 as illustrated in FIG. 6 for moving a door of a lift cage comprises a peripheral adaptation unit 2a for lift doors, two motor control units 3a, each of which has a drive unit connected thereto, here an exemplary drive unit 4a. The peripheral adaptation unit 2a and the motor control units 3a are connected together via a DC voltage intermediate circuit 71 for the purpose of transmitting electrical power and via a communication link 72 for the purpose of transmitting activation commands for subjecting the output voltage for the drive units 4a to open-loop control or closed-loop control.

Figure 7:
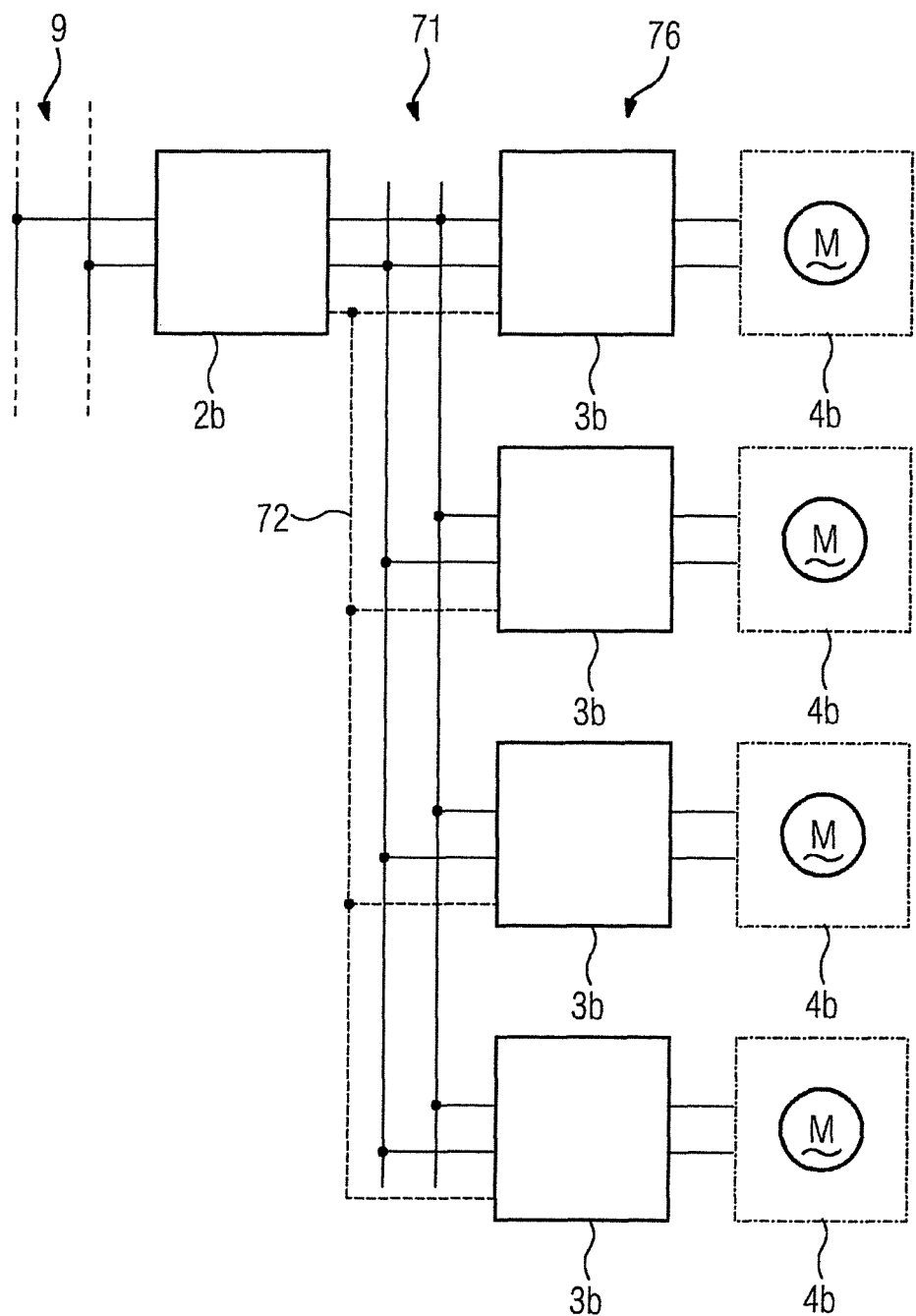
Figure 8:
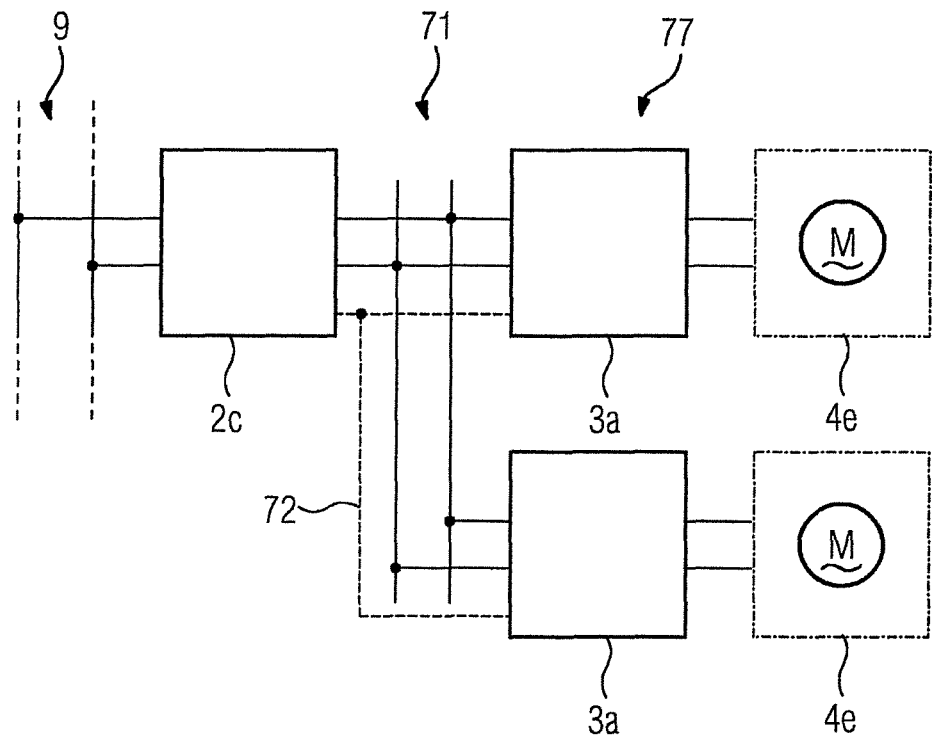

A door drive 76 as illustrated in FIG. 7 for moving train platform doors comprises a peripheral adaptation unit 2b for train platform doors, four motor control units 3b, each of which has a drive unit connected thereto, here an exemplary drive unit 4b. The peripheral adaptation unit 2b and the motor control units 3b are connected together via a DC voltage intermediate circuit 71 for the purpose of transmitting electrical power and via communication links 72 for the purpose of transmitting activation commands for subjecting the output voltage for the drive units 4b to open-loop control or closed-loop control.

A door drive 77 as illustrated in FIG. 6 for moving doors of a machine tool comprises a peripheral adaptation unit 2c for machine tools, two motor control units 3a, each of which has a drive unit 4e connected thereto. The peripheral adaptation unit 2c and the motor control units 3a are connected together via a DC voltage intermediate circuit 71 for the purpose of transmitting electrical power and via communication links 72 for the purpose of transmitting activation commands for subjecting the output voltage for the drive units 4e to open-loop control or closed-loop control.

FIGS. 9 to 15 show exemplary mounting positions for the door drives of FIGS. 5 and 6.

Figure 9:
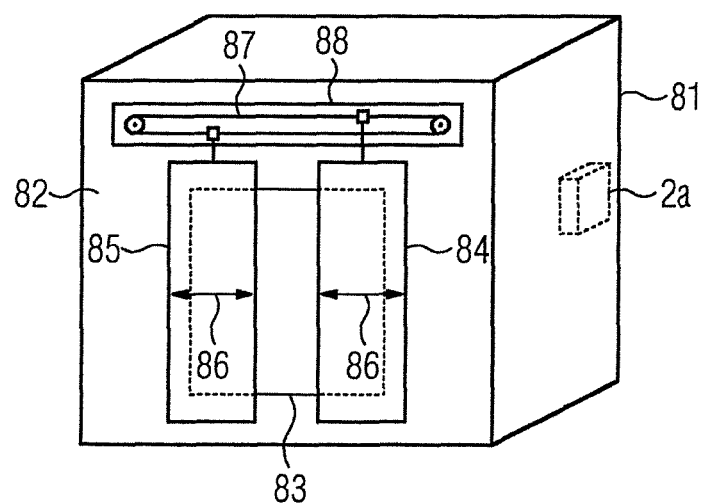
FIGS. 9-15 show exemplary mounting positions mounting positions for the door drives of FIGS. 5 and 6.

In this case, FIG. 9 shows a lift cage 81, on whose front side 82 is formed a door opening 83. Two door leaves 84, 85 of equal size are arranged on the front side 82 and move in opposing directions. The opening and closing directions of the door leaves 84, 85 are designated 86. A drive mechanism 87 is used to move the door leaves 84, 85 and is attached to a top chassis 88, which is itself attached to the front side 82 of the lift cage 81 above the door opening 83. Examples of the drive mechanism 87 are illustrated in FIGS. 10 to 15.

Figure 10:
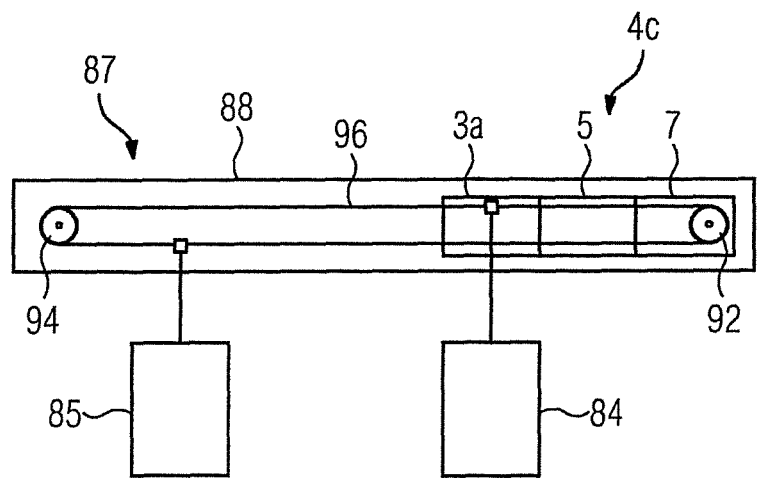
Figure 11:
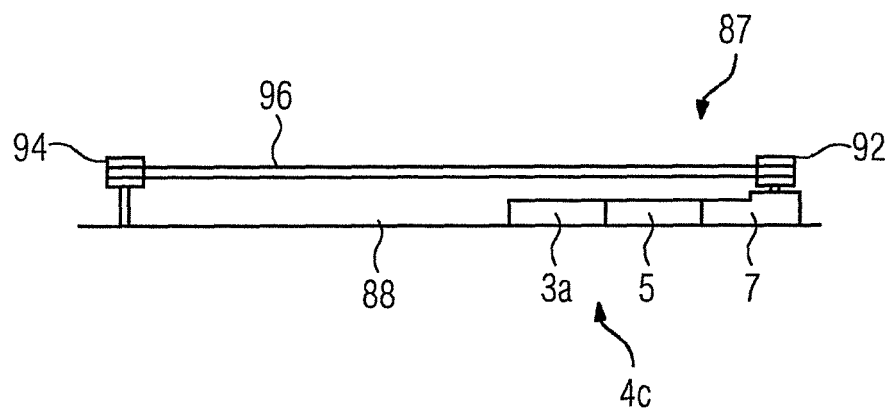

A first drive mechanism 87, shown in front view in FIG. 10 and in plan view in FIG. 11, comprises a motor control unit 3a and a drive unit 4c, these being attached to the top chassis 88. The drive unit 4c in this case comprises a rotatory electric motor 5 that turns about an axis of rotation, and a bevel gear 7 on the load side (driven side). The axis of rotation of the motor runs in the opening and closing direction 86, and the driven-side free end of the shaft of the bevel gear 7 runs perpendicular to the opening and closing direction 86. A driving pinion, driving wheel, belt wheel 92 or similar is attached to the driven-side free end of the shaft of the bevel gear 7. Interacting with a guide pulley 94 that is mounted at the opposite end of the top chassis 88, the belt wheel 92 guides a toughened toothed belt 96 that transmits the driving force of the motor 5 to the door leaves 84, 85. A toothed rack or a flat rope can also be used as an alternative to the toothed belt 96. The associated peripheral adaptation unit 2a is arranged in the lift cage 81 and is spatially separate from the motor control unit 3a, such as behind a switch indicator panel in the interior space of the lift cage 81 and accessible from there (see FIG. 9). The power transmission from the peripheral adaptation unit 2a to the motor control unit 3a takes place via a DC voltage intermediate circuit that is not shown in further detail. A communication link (not shown in further detail) for transmitting the activation commands is also provided between the peripheral adaptation unit 2a and the motor control unit 3a. The motor control unit 3a and the drive unit 4c attached thereto are connected together mechanically and form a preassembled unit.

Figure 12:
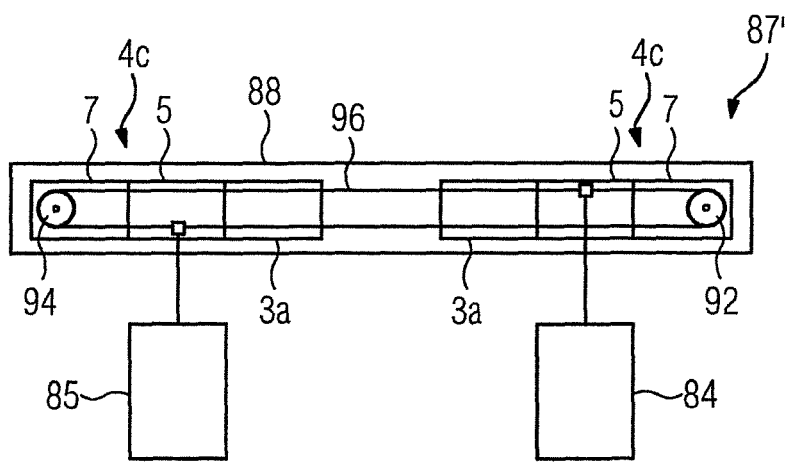

A second drive mechanism 87' shown in a frontal view in FIG. 12 differs from the drive mechanism 87 shown in FIGS. 10 and 11 in that the guide pulley 94 is also driven. In order to achieve this, provision is made for a further motor control unit 3a and a further drive unit 4c including a motor 5 and a bevel gear 7 on the load side.

Figure 13:
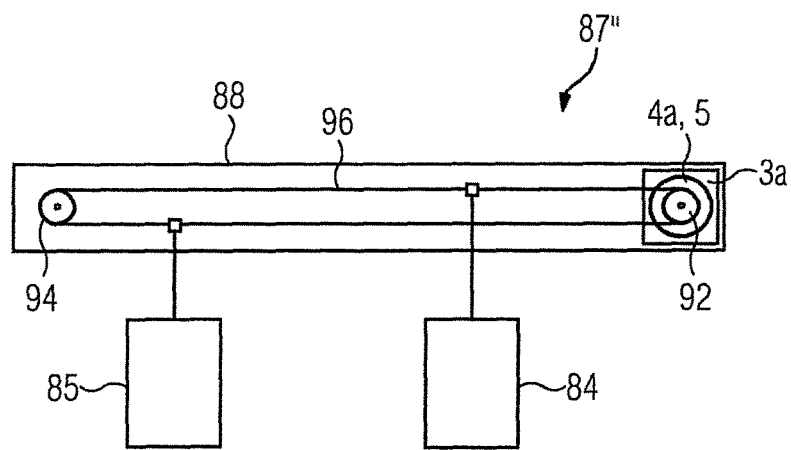
Figure 14:
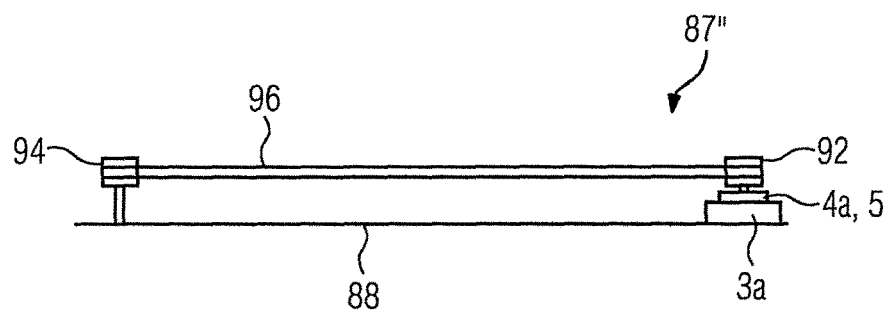

A third drive mechanism 87" shown in a frontal view in FIG. 13 and in a plan view in FIG. 14 comprises a motor control unit 3a and a drive unit 4a, these being attached to the top chassis 88, one behind the other perpendicular to the direction of movement 86 of the door leaves 84, 85. The drive unit 4a in this case comprises an electric motor 5 that is configured as a gearless rotatory motor that turns about an axis of rotation and whose extent in the direction of the axis of rotation is smaller than its extent perpendicular to the axis of rotation. The axis of rotation of the motor runs perpendicular to the opening and closing direction 86 of the door leaves 84, 85 and is also perpendicular to the front side 82 of the lift cage 81. The belt wheel 92 is attached to the motor 5 on the driven side. The motor control unit 3a and the drive unit 4a attached thereto are connected together mechanically and form a preassembled unit.

Figure 15:
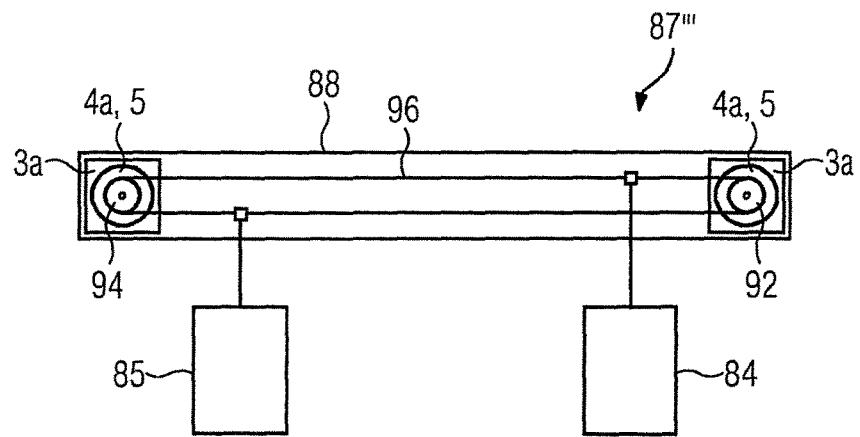

A third drive mechanism 87''' shown in a frontal view in FIG. 15 differs from the drive mechanism 87" shown in FIGS. 13 and 14 in that the guide pulley 94 is also driven. In order to achieve this, provision is made for a further motor control unit 3a and a further drive unit 4a including a motor 5 having an axis of rotation that is perpendicular to the opening and closing direction 86 of the door leaves 84, 85.

In the cases shown in FIGS. 12 to 15, a shared peripheral adaptation unit is assigned to the one motor control unit or both of the motor control units, and is arranged in the lift cage 81 so as to be spatially separate from the motor control unit or motor control units. For example, it may be arranged behind a switch indicator panel in the interior space of the lift cage 81, and can also be accessed from there (see FIG. 9). The power transmission from the peripheral adaptation unit to the motor control unit(s) occurs via a DC voltage intermediate circuit (not shown in further detail). A communication link (not shown in further detail) is also provided between the peripheral adaptation unit and the motor control unit(s) for the purpose of transmitting the activation commands to the motor control unit(s).

Figure 16:
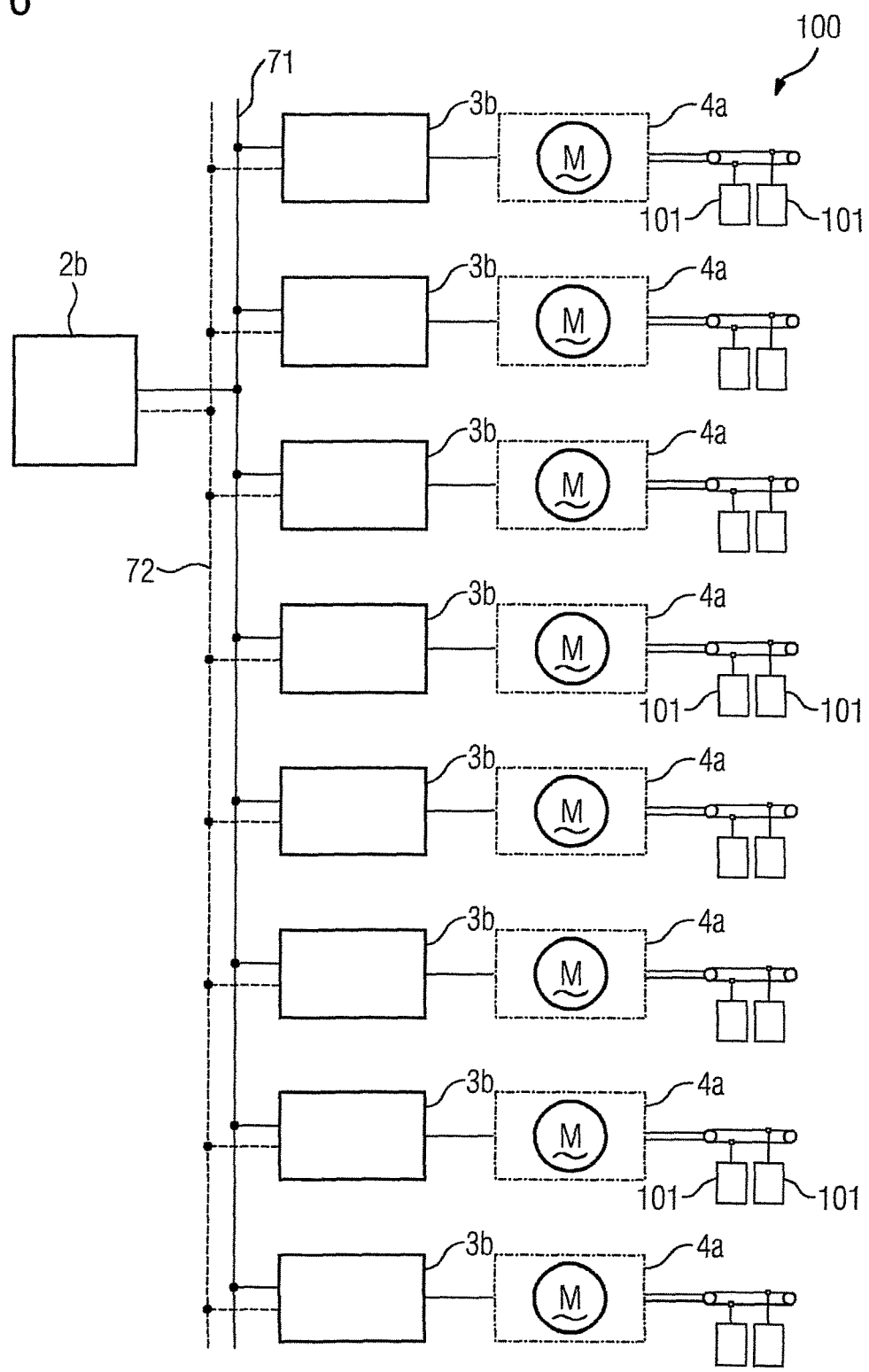
FIG. 16 shows a train platform door system which is realized using a modular door drive system in accordance with the invention.

A door drive system 100 for train platform doors as shown in FIG. 16 has a single-phase layout for the sake of simplicity and comprises one peripheral adaptation unit 2b and eight motor control units 3b with respectively attached drive units 4a for a total of eight doors or door leaves 101. The peripheral adaptation unit 2b and the eight motor control units 3b are connected together via a DC voltage intermediate circuit 71 for the purpose of electrical power transmission and via communication links 72 for the purpose of transmitting activation commands. By virtue of the DC voltage intermediate circuit 71, the motor control units 3b and drive units 4a can be operated on a shared power axis, i.e., using identical voltage and frequency, and hence synchronously.

If it is not necessary for drive motors to be accelerated or braked simultaneously, it is possible via temporal synchronization to operate some of the motor control units 3b in acceleration mode and other motor control units 3b in braking mode, and consequently use the accrued braking energy of some of the drive units to accelerate the other drive units via the intermediate circuit 72, in order to achieve energy savings and reduce power losses in the motor control units 3b.

The peripheral adaptation unit 2b are arranged spatially separate from the eight motor control units 3b, in this case. The peripheral adaptation unit 2b may be arranged in an electrical-control cabinet, for example, and the motor control units 3b at the respective doors.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A modular door drive control system for subjecting electrical drive motors to at least one of open-loop control and closed-loop control to open and close doors or door leaves in different applications, comprising:

are electrical drive motor;

at least one motor control unit connected to the drive motor, the at least one motor control unit having an application-independent configuration for generating an output voltage to feed the electrical drive motor, and having a device for subjecting the output voltage to at least one of open-loop control and closed-loop control depending on activation commands received via a communication link; and a plurality of peripheral adaptation units each having a different application-dependent configuration for adapting the motor control unit or a plurality of the motor control units to one application of the different applications;

wherein one of (i) the at least one motor control unit and (ii) a plurality of the motor control units is selectively connectable to any peripheral adaptation unit of the peripheral adaptation units via a shared intermediate circuit transmit electrical power for the drive motor respectively connected thereto.

2. The door drive control system as claimed in claim 1, wherein each of the plurality of peripheral adaptation units includes application-dependent input interfaces for at least one of (i) a voltage supply, (ii) control signals and (iii) communication with a superordinate controller, and includes application-independent output interfaces for connection to the intermediate circuit and to connect communication links to the at least one motor unit.

3. The door drive control system as claimed in claim 1, wherein each of the plurality of peripheral adaptation units include a device comprising, a microcontroller to control the plurality of peripheral adaptation units and to generate application-dependent activation commands for the at least one motor unit, and wherein the at least one motor unit is selectively connectable via the communication link to any peripheral adaptation of the plurality of peripheral adaptation writs to transmit the application-dependent activation commands to the at least one motor unit.

4. The door drive control system as claimed in claim 1, wherein the plurality of peripheral adaptation units are configured to convert an application-dependent input voltage which is present at an application-dependent interface for a voltage supply into an application-independent output voltage fur the intermediate circuit.

5. The door drive control system as claimed in claim 1, wherein the plurality of peripheral adaptation units are configured to provide application-dependent functions for processing an input-side supply voltage comprising one of protection against short-circuit, rectification of the supply voltage, network filtering for increased electromagnetic interference resistance, power factor correction, protection against network overvoltage and network under voltage.

6. The door drive control system as claimed in claim 1, wherein the plurality of peripheral adaptation units are configured to provide application-dependent functions for a braking mode of the drive motors comprising one of electrical ballast resistance including activation for limiting an intermediate circuit voltage in cases of regenerative motor operation, store braking energy for subsequent use during acceleration and return feed of braking energy into a supply network.

7. The door drive control system as claimed in claim 1, wherein the plurality of peripheral adaptation units comprise an emergency power device.

8. The door drive control system as claimed in claim 1, wherein the plurality of peripheral adaptation units are configured to allow application-dependent use and monitoring of a door drive controller.

9. The door drive control system as claimed in claim 1, wherein the plurality of peripheral adaptation units are configured to provide temporal synchronization of motive processes of electrical drive motors if a plurality of motor control units are connected thereto.

10. The door drive control system as claimed in claim 1, wherein the plurality of peripheral adaptation unit are arrangeable such that they spatially separate from the at least one motor unit.

11. The door drive control system as claimed in claim 1, wherein each of the plurality of peripheral adaptation unit includes a device for coupling to a cyber-physical system.

12. The door drive control system as claimed in claim 1, wherein the at least one motor control unit includes application-independent input interfaces for connection to the intermediate circuit and to provide a communication link to a peripheral adaptation unit of the plurality of peripheral adaptation units, and includes application-independent output interfaces for connection of the at least one drive motor.

13. The door drive control system as claimed in claim 1, wherein the at least one motor control unit includes at least one secure input for capturing safety-relevant information.

14. A modular door drive system comprising the door drive control system as claimed in claim 1 and having a plurality of different drive units of application-independent configuration, each having a respective electrical drive motor for connection to the at least one motor unit.

15. The modular door drive system as claimed in claim 14, wherein each the drive unit of the plurality of different drive units includes an electric motor which comprises a gearless rotatory motor which turns about an axis of rotation and whose extent in a direction of the axis of rotation is smaller than its extent perpendicular to the axis of rotation.

16. The door drive system as claimed in claim 14, wherein the drive unit comprises a rotatory electric motor which turns about an axis of rotation and includes gearing comprising a bevel gear connected on a load side comprising a driven side.

17. The door drive system as claimed claim 14, wherein the at least one motor unit and the plurality of different drive units attached thereto are connected together mechanically to form a preassembled unit.

18. The door drive system as claimed claim 15, wherein the at least one motor unit and the plurality of different drive units attached thereto are connected together mechanically to form a preassembled unit.

19. The door drive system as claimed claim 16, wherein the at least one motor unit and the plurality of different drive units attached thereto are connected together mechanically to form a preassembled unit.

20. The door drive system as claimed in claim 1, wherein the different applications comprise open and close doors or door leaves in one of a lift, on a train platform or at a machine tool.

21. The door drive system as claimed in claim 1, wherein the shared intermediate circuit comprises a DC voltage intermediate circuit.

* * * * *